United States Patent [19]
Coté

[11] 3,980,876
[45] Sept. 14, 1976

[54] PROTECTIVE TERMINAL FOR MULTIPLE FLASH LAMP UNIT

[75] Inventor: Paul T. Coté, Cleveland Heights, Ohio

[73] Assignee: General Electric Company, Schenectady, N.Y.

[22] Filed: July 3, 1974

[21] Appl. No.: 485,460

[52] U.S. Cl.............................. 240/1.3; 174/68.5; 317/101 CC; 339/17 R
[51] Int. Cl.².......................................... G03B 15/02
[58] Field of Search................ 240/1.3, 103 R; 317/101 CC, 101 DH, 101 F; 339/17 R; 354/126, 127, 148; 431/92, 93, 95 R, 95 A; 174/68.5

[56] References Cited
UNITED STATES PATENTS

| | | | |
|---|---|---|---|
| 3,127,112 | 3/1964 | McCammon et al. | 240/1.3 |
| 3,271,624 | 9/1966 | Kingma et al. | 317/81 |
| 3,433,888 | 3/1969 | Tally et al. | 339/17 R X |
| 3,473,880 | 10/1969 | Wick | 240/1.3 X |
| 3,568,129 | 3/1971 | Gold et al. | 317/101 CC X |
| 3,598,985 | 8/1971 | Harnden et al. | 240/1.3 |
| 3,608,451 | 9/1971 | Kelem | 240/1.3 X |
| 3,710,704 | 1/1973 | Wagner | 240/1.3 |

*Primary Examiner*—Fred L. Braun
*Attorney, Agent, or Firm*—Norman C. Fulmer; Lawrence R. Kempton; Frank L. Neuhauser

[57] ABSTRACT

A multiple flash lamp unit having a group of electrical connector terminals adapted to be plugged into a socket. The unit is provided with a transverse protective terminal which momentarily electrically shorts across the socket contacts while the unit is being plugged into the socket, so as to discharge any residual voltage in the firing pulse source, such as a piezoelectric element, before the lamp connector terminals engage the socket contacts. The transverse protective terminal may be integral with a lamp connector terminal, and preferably is integral with a terminal connected electrically so as to have a relatively large stray capacitance to ground.

25 Claims, 5 Drawing Figures

U.S. Patent  Sept. 14, 1976  3,980,876
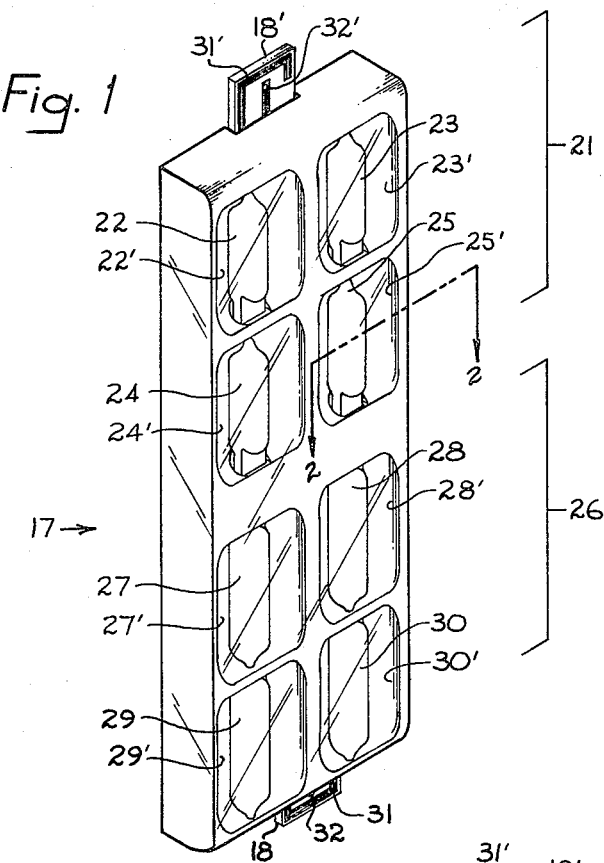
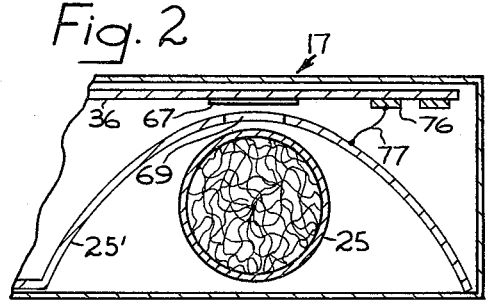
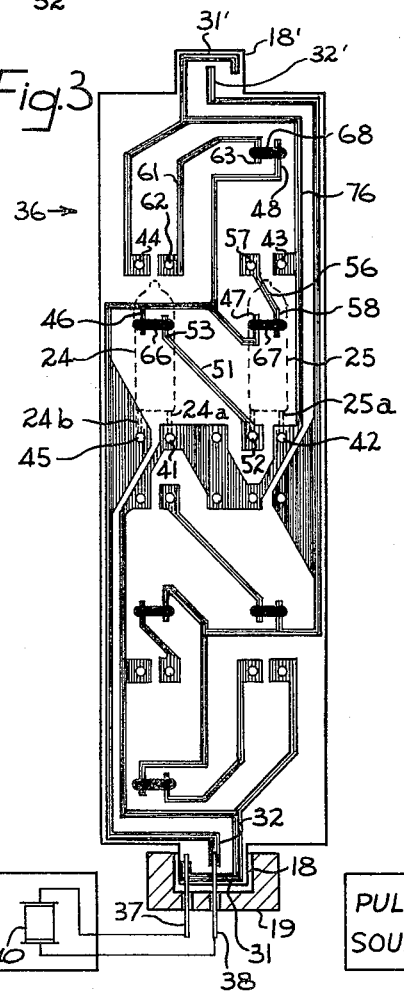
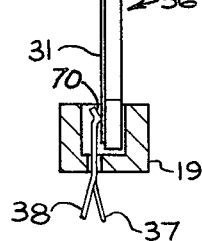
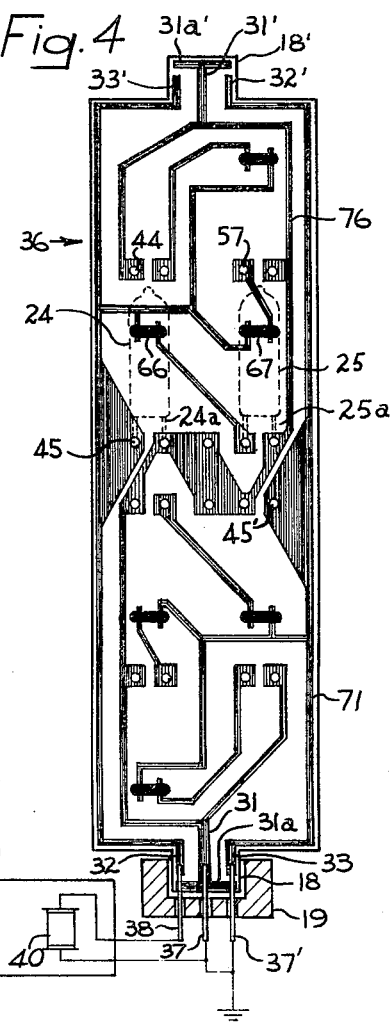

PROTECTIVE TERMINAL FOR MULTIPLE FLASH LAMP UNIT

CROSS-REFERENCES TO RELATED APPLICATIONS

Ser. No. 448,671, filed Mar. 6, 1974 now U.S. Pat. No. 3,937,946, Kurt H. Weber, "Multiple Flash Lamp Unit", assigned the same as this invention.

Ser. No. 485,459, filed concurrently herewith, Richard Blount, "Multiple Flash Lamp Unit", assigned the same as this invention.

Ser. No. 485,422, filed concurrently herewith, Paul T. Coté, "Multiple Flash Lamp Unit", assigned the same as this invention.

BACKGROUND OF THE INVENTION

The invention is in the field of multiple photoflash lamp units, such as flashcubes and planar arrays.

U.S. Pat. Nos. 3,598,984 to Stanley Slomski and 3,598,985 to John Harnden and William Kornrumpf disclose a multiple flash array having first and second groups of flash lamps and reflectors facing in mutually opposite directions. The array is plugged into the camera whereby the first group of lamps faces frontwardly and is connected for the lamps of that group to be flashed. When these lamps have been flashed, the array is turned around and the lamps of the second group face frontwardly and are connected to be flashed. The lamps usually are flashed one at a time; however, a plurality of lamps can be flashed simultaneously if more light is desired.

The above-referenced patent application of Kurt Weber discloses a multiple flash lamp unit that can be connected to a camera in different orientations in each of which a different group of the flash lamps is relatively farther from the camera lens axis than are the other lamps of the unit. The lamps and electrical circuitry are arranged so that in any of the orientations of the unit with respect to the camera, only the group of lamps relatively farther from the lens axis can be flashed. The purpose of such an arrangement is to position the "active " group of flash lamps farther above the camera lens, in order to reduce the possibility of a "red-eye" effect that causes the pupils of a person's eyes to appear red or pink in flash pictures taken when the flash lamp is close to the camera lens.

The above-referenced Blount patent application discloses a multiple-group of lamp type of flash unit having an additional terminal for causing electrical shorting of the group of lamps that are not to be flashed in each orientation of the unit.

Each of the above-referenced multiple flash lamp units has, in a preferred embodiment, a plug-in connector tab provided with a plurality of electrical connection terminals in the form of conductive stripes printed on or otherwise attached to the connector tab. The various connector terminals are connected to individual lamps or to sequential firing circuitry interconnected with lamps in the unit. Such flash units, and particularly if they employ high voltage types of flash lamps which are flashed by a high voltage pulse (1000 or 2000 volts, for example) of low current energy, are prone to electrostatic firing of one or mor lamps if a connection terminal is touched by a person or object having an electrostatic charge. Such undesirable accidental flashing of lamps can also occur if the flash unit housing, which usually is made of a plastic material, acquires an electrostatic charge and a connector terminal is touched. The problem can also occur, and can be more severe, if both the plastic housing and the person or object touching a connection terminal are electrostatically charged with relatively opposite polarities.

The above-referenced Coté patent application discloses a terminal circuit arrangement for reducing the likelihood of accidental flashing of lamps by electrostatic charge when the terminals are touched while handling the unit. This is accomplished by making one of the terminals longer or otherwise more readily touchable than the others, and by connecting this more touchable terminal electrically in the unit so as to have more stray capacitance to ground than the other terminals.

Another way that a lamp can be undesirably and accidentally flashed is if there is a voltage across the socket contacts, when the unit is plugged into the socket, sufficient to flash a lamp. It is found that this can occur, for example, when the firing pulse source is a piezoelectric element connected electrically across the socket contacts and impacted in synchronism with opening of the shutter so as to produce a firing pulse for flashing a lamp. Arrangements of this type are disclosed in U.S. Pat. Nos. 2,972,937 and 3,106,080 to C. G. Suits. The piezoelectric element is impacted by a striker each time the camera shutter is actuated, whether or not a flash picture is being taken. If a flash lamp is connected across the piezoelectric element, it becomes flashed when a picture is taken. If a flash lamp is not connected across the element when a picture is taken, the element produces a voltage pulse (of 2000 volts, for example) when impacted, and the voltage across the element returns to zero value due to production of equal voltage of opposite polarity upon unstressing of the element when the impact pressure is released. However, it has been found that lamps will occasionally be flashed when the flash lamp, or mulitple flash lamp unit, it plugged into the socket after a non-flash picture has been taken. This is due to a residual or remanent voltage sometimes remaining in and across the piezoelectric element after a non-flash picture is taken. This is believed to occur because certain piezoelectric elements occasionally have a partial voltage breakdown while producing a voltage pulse, resulting in a retained residual voltage when the element is not loaded by a flash lamp. For example, assume that a non-loaded piezoelectric element is impacted and produces a voltage pulse of 2000 volts which is partially dissipated, due to a direct partial voltage breakdown or sparking or a partial corona discharge, to a value of 1000 volts, upon unstressing of the element after the impact, it will produce a reverse voltage of 2000 volts and thus will retain a residual voltage of 1000 volts of opposite polarity from the impact-produced pulse, and this residual voltage can remain long enough and at a high enough voltage to flash a lamp when the lamp or a unit containing the lamp is plugged into the socket.

SUMMARY OF THE INVENTION

Objects of the invention are to provide an improved flash lamp unit; to provide means for preventing accidental electrostatic flashing of lamps in such a unit; to provide means for preventing accidental flashing of lamps by residual voltage in the firing pulse generator; and to provide such accidental flash prevention in a manner that is feasible and economical to manufacture.

The invention comprises, briefly and in a preferred embodiment, a multiple flash lamp unit having a connector provided with terminals thereon and adapted to be joined with coupler socket having such as a contacts for contacting the connector terminals. The connector of the flash unit is provided with a conductor or transverse protective terminal near the end thereof adapted to momentarily engage and electrically short across the socket contacts while the connector is being plugged into the socket, so as to discharge any residual voltage in the firing pulse source before the lamp connector terminals engage the socket contacts. The transverse protective terminal may be integral with a lamp connector terminal, and preferably is integral with a terminal that is connected via circuitry to lamps in the unit such that this terminal and its associated circuitry has relatively more stray capacitance to ground than any of the other terminals and their circuitry. This one terminal, integral with the transverse terminal near the end of the connector, is more readily touched than the other terminals when the unit is handled, thus reducing the likelihood of lamps being accidentally flashed by electrostatic charges. In a preferred embodiment, the more touchable terminal is electrically connected in common to a lead-in wire of each of the lamps in the unit and also is connected to a large-area shield member in the unit, to increase its stray capacitance to ground. By thus making one terminal more readily touchable and providing it with a relatively larger stray capacitance to ground, an electrostatic charge applied to this terminal will be principally diverted through the large stray capacitance to ground instead of passing through flash lamps in the unit.

BRIEF DESCRIPTION OF THE DRAWING

FIG. 1 is a perspective view of a multiple flash lamp unit in accordance with a preferred embodiment of the invention.

FIG. 2 is a cross-sectional view of a portion of FIG. 1, taken on the line 2—2 thereof.

FIG. 3 is a front view of a circuit board to which flash lamps are connected in the multiple lamp unit, shown plugged into a socket.

FIG. 4 is a front view of a circuit board in accordance with an alternative preferred embodiment of the invention.

FIG. 5 is a side sectional view of a socket and circuit board.

DESCRIPTION OF THE PREFERRED EMBODIMENT

A multiple flash lamp unit 17, shown as being of the planar array type and containing a plurality of electrically fired flash lamps, is provided with a plug-in connector tab 18 at the lower side or end thereof, adapted to fit into a coupler or socket 19 (FIGS. 3, 4, 5) of a camera or flash adapter. The lamp array 17 is provided with a second plug-in connector tab 18' at the top side or end thereof, whereby the array 17 is adapted to be attached to the socket 19 in either of two orientations, i.e., with either the tab 18 or the tab 18' plugged into the socket 19. The array 17 is provided with an upper group 21 of flash lamps 22, 23, 24, and 25, and a lower group 26 of flash lamps 27, 28, 29, and 30. Reflectors 22', etc., are disposed behind the respective flash lamps, so that as each lamp is flashed its light is projected forwardly of the array 17. The relationship of each reflector to its associated lamp, and a suitable plastic housing and transparent front cover, may be generally as is disclosed in the above-referenced planar array patents.

With the array 17 oriented and plugged into the socket 19 as shown in FIGS. 3 and 4, only the upper four lamps of the array, which constitute the upper group 21, can be flashed, and the four lamps of the lower group 26 are inactive and will not flash. Thus, the above-described undesirable red-eye effect is reduced or eliminated, since the only lamps of the array that can flash are grouped relatively far from the socket 19 and hence from the axis of the camera's lens. The array 17 can be removed from the socket 19, either before or after all lamps of the upper group 21 have been flashed, and turned around, with the upper tab 18' now the lower tab which is inserted into the socket 19, whereupon the group 26 of lamps becomes the upper group, and its lamps are flashed, again reducing or eliminating the red-eye effect because the active lamps are relatively farthest from the socket 19 and hence from the axis of the camera's lens.

Electrical connector terminals are provided at the tabs 18 and 18', and if flash sequencing circuitry is included in the multiple flash unit, for instance as illustrated in FIG. 3, only two electrical terminals, which may be in the form of printed circuit stripes, need be provided on each tab for connecting the upper or active group of lamps to the socket 19. Thus, tab 18 is provided with a pair of electrical terminals 31 and 32, and the tab 18' is provided with a pair of terminals 31' and 32'.

FIG. 3 shows a circuit board 36 for the embodiment of FIG. 1 which can be contained within the housing of the unit 17 behind the reflectors 22', etc., and which supports the flash lamps by their lead-in wires and provides for sequential firing of each group of lamps. The plug-in connector tabs 18 and 18' may be formed integrally with the circuit board 36 at opposite ends thereof, as shown. The top and bottom halves of the printed circuitry are reverse mirror images of each other.

The camera socket 19 for the flash unit 17 is provided with a pair of contacts 37 and 38 which respectively electrically engage the terminals 31 and 32 (or 31' and 32') of the flash unit when it is plugged into the socket 19.

A firing pulse source 39, which may be contained within a camera or flash adapter, is connected to the contacts 37 and 38 of the socket 19. The type of firing pulse produced by the source 39 and applied across the contacts 37 and 38 will of course depend on the type of lamps used in the flash unit 17. If the low voltage filament types of flash lamps are employed in the unit 17, the firing pulse source 39 may be a battery or battery-capacitor discharge type, producing, in synchronization with opening of the camera shutter, a pulse of approximately 3 volts to 15 volts or more and of sufficient energy to fire a single flash lamp. An example of a low voltage flash lamp is disclosed in U.S. Pat. No. 3,506,385 to Kurt Weber and George Cressman, and an example of a low voltage flash sequencing circuit is disclosed in U.S. Pat. No. 3,532,931 to Paul Coté and John Harnden. If the flash lamps in the multiple flash unit 17 are of the so-called high voltage type, requiring a pulse of approximately 1000 or 2000 volts or more, the firing pulse source 39 may comprise a suitable battery-capacitor discharge and voltage step-up transformer type of circuit, or preferably may employ a compact piezoelectric element 40 arranged to be impacted or stressed in synchronization with opening of the camera shutter, so as to produce a firing pulse having a voltage of approximately 1000 or 2000 volts or more and of sufficient energy to fire a single flash lamp having a primer between its lead-in wires. An example of a high voltage flash lamp and a firing pulse source comprising a piezoelectric element synchronized with a camera shutter is described in the above-referenced patents to C. G. Suits.

The circuit board 36 in FIG. 3 is shown in the orientation in which the connector tab 18 faces downwardly and is plugged into the socket 19, whereby the circuit board terminals 31 and 32 respectively make electrical contact with the socket contacts 37 and 38, as shown in FIG. 5. The circuit board terminal 31 is part of a continuous conductor run on the board, which is connected in common to one electrical lead wire (22a, 23a, 24a, etc.) of each of the eight flash lamps 22, 23, 24, etc., in the unit at points 41, 42, 43, 44, etc., by suitable means such as soldering, welding, or crimping. For the sake of clarity, only two flash lamps 24 and 25 are shown in FIG. 3, and in dashed lines. Suitable openings are provided through the reflectors at the bases of the lamps to permit the connections of the lead-in wires to the circuit board.

The circuit board terminal 32 is part of a conductor run that is connected to lead-in wire 24b of lamp 24 at point 45, and terminates at radiation switch terminals 46, 47, and 48 respectively positioned near lamps 24, 25, and 23. A circuit board conductor run 51 is connected to the remaining lead wire of flash lamp 25 at 52, and terminates at a radiation switch terminal 53 which is near to but spaced from radiation switch terminal 46. A circuit board conductor run 56 is connected to the remaining lead-in wire of flash lamp 23 at point 57, and terminates at a radiation switch terminal 58 which is near to but spaced from radiation switch terminal 47. Similarly, a circuit board conductor run 61 is connected to the remaining lead-in wire of flash lamp 22 at point 62, and terminates at a radiation switch terminal 63 which is near to but spaced from the radiation switch terminal 48.

Radiation switches 66, 67, and 68 are respectively positioned to be in contact with and bridge across the respective pairs of switch terminals 46–53, 47–58, and 48–63. The material for the radiation switches 66, 67, and 68 may be suitable material initially having an open circuit or high resistance, the resistance thereof becoming zero or a low value when the material receives radiation in the form of heat and/or light from a respective adjacent lamp, upon the lamp being flashed. For this purpose, each of the radiation switches 66, 67, and 68 is respectively positioned behind and near to a flash lamp 24, 25, 23. Windows in the form of transparent sections or openings 69 may be provided in the reflectors in front of the switches as shown in FIG. 2 to facilitate radiation transfer. A suitable material for the radiation switches 66–68 is silver oxide dispersed in a binder such as polyvinyl resin. Each of these radiation switches, upon receiving heat and/or light radiation from the adjacent lamp when it is flashed, changes from an open circuit or high resistance to a closed circuit or low resistance between its switch terminals on the circuit board.

As has been explained, the lower portion of the circuit board contains a substantially reverse mirror image of the same circuit shown in the upper part of the circuit board, and therefore will not be described in detail. It will be noted that the circuit runs from the plugged-in terminals 31 and 32 at the lower part of the circuit board extend upwardly so as to activate the circuitry in the upper half of the circuit board. Similarly, when the unit is turned around and tab 18' is plugged into the socket 16, the circuit board terminals 31' and 32' will be connected to and activate the lamps which then will be in the upper half of the circuit board, and hence in the upper half of the flash unit 17. This accomplishes, as has been stated, the desirable characteristic whereby only the group of lamps relatively farthest away from the lens axis will be flashed, thereby reducing or eliminating the undesirable red-eye effect.

The circuit of FIG. 3 functions as follows. Assuming that none of the four lamps in the upper half of the unit 17 have been flashed, upon occurrence of a first firing pulse from the source 39, this pulse will be directly applied to the lead-in wires of the first-connected flash lamp 24, whereupon the lamp 24 flashes and becomes an open circuit between its lead-in wires. Heat and/or light radiation from the flashing first lamp 24 causes the adjacent radiation switch 66 to become a closed circuit between terminals 46 and 53 (or a low value of resistance), thereby connecting the circuit board terminal 32 electrically to the lead-in wire of the second lamp 25 at point 52. By the time this occurs, the firing pulse has diminished to a value insufficient to cause the second lamp 25 to flash. When the next firing pulse occurs, it is applied to the lead-in wires of the second lamp 25, via the now closed radiation switch 66, whereupon the second lamp 25 flashes, thereby causing radiation switch 67 to assume zero or low resistance, and the second lamp 25 now has an open circuit or high resistance between its lead-in wires. When the next firing pulse occurs, it is applied via now closed radiation switch 67 to the third lamp 23 via its lead-in wires which are connected to the printed circuit at points 43 and 57, thereby firing the lamp which becomes an open circuit, and the radiation from it causes the radiation switch 68 to become essentially a closed circuit across its terminals. Thus, the next firing pulse will be applied, via now closed radiation switch 68, to the lead-in wires of the fourth flash lamp 22 which are connected to the circuit at points 44 and 62, thereupon causing the lamp to flash. Since this lamp is the last lamp in the active circuit, it does not matter whether its lead-in wires are an open or closed circuit after flashing. Additional flash lamps, radiation switches, and electrical conductors can be employed, if desired, using the just described principles. When the flash unit is turned around and the other connector tab 18' attached to the socket 16, the group of lamps that then become uppermost and relatively farthest away from the lens axis will be in an active circuit and will be flashed in the same manner as has been described.

The embodiment thus far described is similar to that disclosed in the above-referenced Weber patent application.

In accordance with the invention, a protective terminal is arranged transversely across at least a portion of the tab 18 (and also 18') at or near the end thereof. In the embodiment of FIGS. 1 and 3, the protective terminal is a conductor which is integral with the connector terminal 31 that is connected in common to all of the flash lamps, the combined connector terminal and protective terminal 31 (and 31') having a J shape around the other connector terminal 32 (and 32'). As shown in FIG. 5, the socket contacts 37 and 38 have curved regions 70 at their upper ends, which engage against the side of the connector tab 18 or 18'. While the connector tab 18, for example, is being plugged into the socket 19 during initial joining thereof, the transverse protective part of terminal 31 slides into engagement with both socket contacts 37 and 38, thus shorting across and discharging any residual voltage or charge which may be in the piezoelectric element 40 or other firing pulse means in the pulse source 39. Such shorting occurs prior to engagement of the terminal 32 with the socket contact 38 and thus any residual voltage is discharged before it can fire a lamp. Upon continuing downward motion of the connector tab 18 during final joining to the socket 19, the transverse part of terminal 31 slides out of engagement with socket contact 38 thus removing the aforesaid shorting, and when the tab 18 is fully seated in the socket, the connector terminal 32 will be in contact with the socket contact 38 and the connector terminal 31 will remain in contact with the socket contact 37, and the assembly will be ready for flashing lamps in the manner described above. The socket contact 37 can be positioned to engage against the short leg of the J-shaped terminal 31, as shown, or could be positioned to the right so as to engage against the long leg of the J-shaped terminal 31.

The transverse protective portion of the terminal 31 could be electrically isolated from the connector terminals on the connector tab 18 and would perform its function of momentarily shorting the pulse source 39, when the unit 17 is being plugged into the socket 19, to discharge any residual voltage at the socket connectors 37 and 38, and also, being nearer the end of the connector tab than are the connector terminals, would serve to reduce the likelihood of the connector terminals being touched while handling the unit, thus reducing the likelihood of accidental electrostatic flashing of a lamp. The transverse protective terminal can be electrically integral with one of the connector terminals, and preferably is integral with the connector terminal 31 which is connected in common to a lead-in wire of each flash lamp in the flash unit, as shown in FIG. 3, and preferably has the J-shape as shown, and, since it substantially surrounds the other terminal, it is more likely to be touched when handling the unit than is the other terminal.

The common terminals 31 and 31', being connected to a lead-in wire of each of the flash lamps in the unit, will have a relatively greater value of stray capacitance to ground than the other terminals. When this more readily touchable common circuit terminal is touched by an electrostatically charged person or object, substantially all of the charge energy will be to ground through the relatively larger capacitance of the common connection circuit rather than passing through the primer of a lamp and hence through the relatively smaller capacitance of the remaining circuitry to ground. If the charged person or object touched only the terminal 32 or only the terminal 32', the dissipative flow would tend to pass through one or more of the lamp primers, creating a spurious electrostatic firing of the lamp or lamps. But since the common connector terminal (i.e., the terminal 31 or 31') is substantially always touched alone or simultaneously with one of the terminals 32 or 32', the electrostatic charge will pass to ground through the relatively larger capacitance of the common connection circuit without tending to flow through a lamp primer.

Simultaneous touching of the common terminal 31 or 32' and one or both of the remaining terminals cannot cause electrostatic flashing because the same voltage is applied to both lead-in wires of the lamps. Usually, if the electrostatic charge is great enough to be likely to flash a lamp, contact will be in the form of a spark between the common terminal 31 or 31' and the electrostatically charged finger or object.

To increase the stray capacitance to ground of the common connection circuit, and therefore further reduce the likelihood of accidental electrostatic firing of lamps, a large-area shield member is connected to the common connection circuit. An advantageous way of achieving this is to provide a one-piece multiple reflector unit, of substantially the same size as the flash unit 17, shaped to provide the individual reflectors 22', 23', etc., and made of metal or metallized plastic and connected electrically to the common connection circuit 76 by means such as a wire 77 (FIG. 2), as described in the above-referenced Cote patent application.

In the preferred embodiment of FIG. 4, the circuit board 36 is the same as in FIG. 3 except for rearrangement of the terminals and the inclusion of an additional terminal on each connector tab. The additional terminal 33 on the plugin tab 18 is connected, via a printed circuit run 71, to the connection point 45' for lamp 28, which is the first lamp to be flashed when the array is turned around so that terminals 31' and 32' are connected to the firing pulse source 39 via the socket 19. The connector terminals 32 and 33 flank the common connector terminal 31. A third contact 37' is provided in the socket 19 for engaging the connector terminal 33, and is electrically connected to the common contact 37. Since the socket contacts 37 and 37' are electrically shorted together, they electrically short together the tab terminals 31 and 33, also at the same time shorting terminals 31' and 32' of the inactive lower group of lamps, thus electrically shorting the input of the circuitry for the inactive group of lamps. Similarly, when the unit is turned around, the socket contacts 37 and 37' will electrically short the terminals 31' and 33' and also terminals 31 and 32, thus shorting the input of the then inactive lamp circuit. This shorting of the inactive lamp circuit prevents accidental flashing of an inactive lamp by stray capacitive coupling of a firing pulse, as is described in detail in the above-referenced Blount patent application. Of course, this precaution is useful only when the inactive lamps have not yet been flashed, and is not necessary if they have already been flashed.

In accordance with the invention, in the embodiment of FIG. 4 each connector tab 18 and 18' is respectively provided with a conductor or transverse protective terminal 31a and 31a', each of which preferably is respectively electrically integral with the common connector terminals 31 and 31', such as in a T shaped configuration as shown. Each of the transverse protective terminals 31a and 31a' extends along or near the end of the respective tabs 18 and 18' and between the tab ends and the other terminals 32, 33 and 32', 33', so that these protective terminals are more likely to be touched than are the other terminals when the unit has been handled. As has been explained above, this reduces the likelihood of accidental electrostatic flashing of lamps when the unit is handled. Also, as has been explained above, the protective terminals 31a and 31a' momentarily contact and short-circuit the socket contacts 37 and 38 while the flash lamp unit is being initially joined or plugged into the socket 19, thereby discharging any undesirable voltage charge that may exist in the pulse source 39. When the flash lamp unit is fully joined or plugged into the socket 19, as shown in FIG. 5, the protective terminal is out of contact with the contacts 37 and 38, which contacts are now in contact with the connector terminals 31 and 32 (or 31' and 32') and the arrangement is ready to sequentially flash the lamps as has been described above.

It has been found that the invention achieves its objectives of reducing the likelihood of accidental electrostatic flashing of lamps in a multiple lamp flash unit, and of reducing the likelihood of accidental flashing of lamps due to residual voltage charge in the firing pulse source, and achieves them in a manner that is fleasible and economical to manufacture.

While a preferred embodiment of the invention has been shown and described, various other embodiments and modifications thereof will become apparent to persons skilled in the art, and will fall within the scope of the invention as defined in the following claims; for example, the invention can have various geometries and be embodied in the form of stacked double-decked flashcubes, and can be applied to other planar array configurations, such as dual-sided arrays, and to multiple flash lamp units which may have more than the two operable orientations that have been specifically described. The term "camera" as used herein is intended to include a flash adapter device for a camera.

What I claim as new and descive to secure by Letters Patent of the United States is:

1. A circuit board for a photoflash array comprising a circuit board member, a tab extending from said circuit board member and having a free end, first and second flash lamp connection areas on said circuit board member, first and second circuit runs on said circuit board member and electrically connected to said first and second lamp connection areas, respectively, first and second connector terminals spaced laterally from one another on said tab and extending toward said free end thereof and electrically connected to said first and second circuit runs, respectively, and an electrical conductor on said tab extending laterally across at least part of the width thereof between the free end of said tab and one of said connector terminals and being spaced from the last-mentioned connector terminal.

2. A circuit board as claimed in claim 1, in which said conductor is electrically connected to the other of said connector terminals.

3. A circuit board as claimed in claim 1, further including two additional flash lamp connection areas on said circuit board member, said first circuit run being electrically connected to one of said additional lamp connection areas, a third circuit run on said circuit board member and electrically connected to the other of said additional lamp connection areas, a third connector terminal spaced laterally from said first and second connector terminals across said tab and electrically connected to said third circuit run, said first connector terminal being located between said second and third connector terminals and being connected electrically to said conductor, said conductor extending laterally of the spaces between the three connector terminals, being located between the free end of the tab and the second and third connector terminals, and being spaced from the last-mentioned terminals.

4. A circuit board for a planar flash array, comprising an elongated circuit board member having first and second integral tabs at the ends thereof, a first group of pair of flash lamp connector areas carried on said circuit board member on a first half thereof that is nearest said first connector tab, a second group of pairs of flash lamp connection areas carried on said circuit board member on a second half thereof that is nearest said second connector tab, three circuit runs carried on said circuit board member, one end portion of the first of the circuit runs forming a first connector terminal on said first tab and the other end portion of the first circuit run forming a first connector terminal on said second tab, said first circuit run being connected electrically with one lamp connection area of each said pair thereof in at least one of said first and second groups thereof, a second of said circuit runs forming a terminal on said first tab and the third of said circuit runs forming a terminal on said second tab, switching circuitry connecting said second circuit run with at least some of the remaining lamp connection areas of said second group of pairs, and switching circuitry connecting said third circuit run with at least some of the remaining lamp connection areas of said first group of pairs, each of said first terminals extending nearer to the end of the respective tab than the other terminal of the tab and including a lateral portion extending transversely between said other terminal and the end of the tab.

5. A circuit board as claimed in claim 4, in combination with an electrically conductive reflector member, and means electrically connecting said reflector member to said first circuit run.

6. A circuit board for a planar flash array comprising an elongated circuit board member having first and second integral tabs at the ends thereof, a first group of pairs of flash lamp connection areas carried on said circuit board member on a first half thereof that is nearest said first connector tab, a second group of pairs of flash lamp connection areas carried on said circuit board member on a second half thereof that is nearest said second connector tab, three circuit runs carried on said circuit board member the three circuit runs having first end portions forming three connector terminals arranged in a row across said first tab and having second end portions forming three connector terminals arranged in a row across said second tab, the terminals formed by a first of said circuit runs being positioned between the terminals formed by the second and third of said circuit runs, said first circuit run being connected electrically with one lamp connection area of each said pair thereof in at least one of said first and second groups thereof, switching circuitry connecting said second circuit run with at least some of the remaining lamp connection areas of said second group of pairs, and switching circuitry connecting said third circuit run with at least some of the remaining lamp connection areas of said first group of pairs, said terminals formed by said first circuit runs extending nearer to the ends of said tabs than the other terminals of the tabs and each including a lateral portion extending transversely between said other terminals and the end of the tab.

7. A circuit board as claimed in claim 6, in combination with an electrically conductive reflector member, and means electrically connecting said reflector member to said first circuit run.

8. Photoflash apparatus comprising a coupler having contacts electrically connected to a firing pulse source, and a flash lamp unit having a connector adapted to be joined removably with said coupler, said connector having electrical terminals located thereon adapted to engage said coupler contacts when said connector and coupler are joined, wherein the flash lamp unit is characterized by means on said connector for (a) creating an electrical short across said coupler contacts during initial joining of said connector and said coupler and prior to said connector terminals electrically engaging with said coupler contacts and (b) removing said electrical short during final joining of said connector and said coupler to place said connector terminals into electrical engagement with said coupler contacts.

9. Photoflash apparatus as claimed in claim 8, in which said connector includes an end spaced from the remainder of the unit, said terminals being spaced from said end, and in which said means comprise a conductor extending transversely of said connector between said end thereof and said connector terminals.

10. Photoflash apparatus as claimed in claim 9, in which said unit comprises a main body portion having a substantially flat surface thereon bounded by edges, said connector extending from said surface of the main body portion with said end thereof spaced from said surface, said terminals extending from the main body portion and along a side of said connector toward said end thereof, said side of the connector being positioned so as to face toward and be spaced from one of said edges.

11. Photoflash apparatus as claimed in claim 9, in which said conductor is a protective terminal which is electrically connected to one of said connector terminals.

12. Photoflash apparatus as claimed in claim 11, in which said unit comprises a main body portion having a substantially flat surface thereon bounded by edges, said connector extending from said surface of the main body portion with said end thereof spaced from said surface, said terminals extending from the main body portion and along a side of said connector toward said end thereof, said side of the connector being positioned so as to face toward and be spaced from one of said edges.

13. Photoflash apparatus as claimed in claim 11, in which said protective terminal is integral with said one connector terminal.

14. Photoflash apparatus as claimed in claim 13, in which said integral protective and connector terminal is generally J-shaped and substantially surrounds the end portion of another terminal.

15. Photoflash apparatus as claimed in claim 13, in which said one connector terminal is flanked by two other terminals, and in which said integral protective and connector terminal is generally T-shaped.

16. Photoflash apparatus as claimed in claim 11, in which said unit contains a plurality of electrically fired flash lamps each having a pair of lead-in conductors, one lead-in conductor of each of said lamps being electrically connected to said one connector terminal.

17. Photoflash apparatus as claimed in claim 16, in which said unit contains a shield member electrically connected to said one connector terminal.

18. Photoflash apparatus as claimed in claim 16, in which said unit contains an electrically conductive reflector member shaped to provide individual reflectors for said lamps, said reflector member being electrically connected to said one connector terminal.

19. Photoflash apparatus as claimed in claim 8, in which the unit is a planar array having said connector extending therefrom at a first end thereof, said unit having a first group of electrically fired flash lamps in a first half thereof near said first end and a second group of electrically fired flash lamps in a second half thereof near a second end thereof, said second group of lamps being connected electrically to said connector terminals, and a second connector extending from said second end of the unit and provided with connector terminals and with means arranged similarly to the terminals and means on the first connector, and said first group of lamps being connected electrically to said connector terminals of the second connector.

20. Photoflash apparatus as claimed in claim 19, in which each of said connectors is provided with an end, said terminals of each connector being spaced from the end thereof, respectively, and in which the means on each connector is a protective terminal which is electrically connected to one of said connector terminals of the respective connector and extends transversely of the respective connector between the end thereof and at least one other terminal of the connector.

21. Photoflash apparatus as claimed in claim 20, in which the protective terminal of each connector is integral with said one connector terminal, each integral protective and connector terminal being generally J-shaped and substantially surrounding another terminal.

22. Photoflash apparatus as claimed in claim 20, in which said one connector terminal of each connector is flanked by two other terminals and is integral with said protective terminal, each integral protective and connector terminal being generally T-shaped.

23. Photoflash apparatus as claimed in claim 20, in which said flash lamps each have a pair of lead-in conductors, said protective terminals of each connector being electrically connected together and to one lead-in conductor of each of said lamps.

24. Photoflash apparatus as claimed in claim 23, in which said unit contains a shield member electrically connected to said protective terminals.

25. Photoflash apparatus as claimed in claim 23, in which said unit contains an electrically conductive reflector member shaped to provide individual reflectors for said lamps, said reflector member being electrically connected to said protective terminals.

* * * * *